United States Patent Office 3,454,136
Patented July 8, 1969

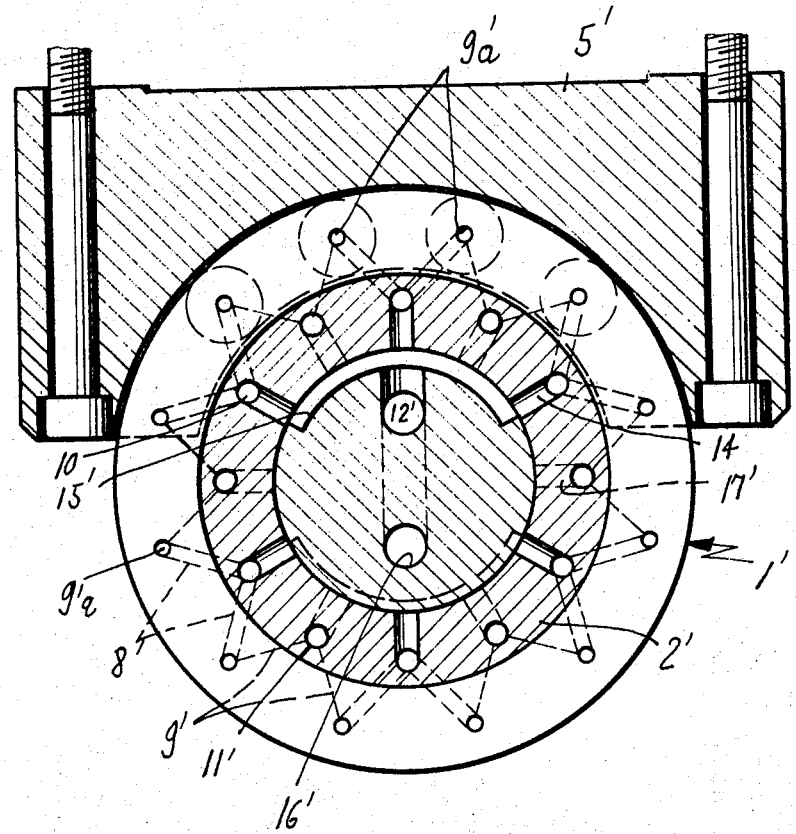

3,454,136
LUBRICATING DEVICE FOR THE INTERENGAGING ELEMENTS OF A WORM AND AN INTERNALLY THREADED MEMBER
Friedrich Stark, Coburg, Germany, assignor to Werkzeugmaschinenfabrik Adolf Waldrich, Coburg, Bavaria, Germany, a corporation of Germany
Filed Feb. 7, 1966, Ser. No. 525,654
Claims priority, application Germany, Mar. 4, 1965,
W 38,679
Int. Cl. F01m 1/00; F16n 17/06, 29/00
U.S. Cl. 184—6                        6 Claims

ABSTRACT OF THE DISCLOSURE

A lubricating device for the interengaging elements of a worm and an internally threaded member, in which the interengaging elements are supplied with a lubricant under pressure and in which the worm has a plurality of equally and circumferentially spaced lubricant passageways, said passageways open to the axially facing sides of the teeth and are connected to several passageways within the worm root so that lubricant is supplied only to the portions of the teeth on the worm which are in engagement with the internally threaded member.

---

This invention relates to a lubricating device for use with a worm gear arrangement, and more particularly, a device for lubricating the interengaging elements with a lubricant under pressure.

The power which can be transmitted by a known worm drive is essentially dependent on the lubricating film formed between the teeth of the interengaging elements. Since at higher peripheral speeds the lubricating film, formed by splash lubrication, is centrifuged and does not even reach the innermost edges of the interengaging elements, a device was tried whereby the lubricating means was sprayed in front of the interengaging elements to counteract the said disadvantage, by means of a forced lubrication. The effectiveness of this means of lubrication, however, was dependent on speed and load, so that the application and, consequently, the use of the worm drives provided with the previously known lubricating devices are limited, especially since their effectiveness is not especially high.

The purpose of the invention is to improve the lubrication between the interengaging elements of a worm and of an internally threaded member for increasing the period of life and the effectiveness of drive means consisting of such parts and also to increase the previously limited range of application of said drives. To solve this problem, the basic idea of the invention is to apply a sufficient quantity of lubricant under sufficiently high pressure between the sides of teeth which are in an interengaging position so that said sides of said teeth stay separated over a larger load and speed range by means of lubrication.

The invention accomplishes this by means of a worm which is provided with a plurality of uniformly spaced lubricant passageways at its periphery, which open to the sides of the teeth. The lubricant passageways are connected to a plurality of distribution passageways provided in the worm root, whereby the lubricant from a control device is fed to only those distribution passageways which are at a given time in connection with the lubricant passageways to the interengaging area of the gear arrangement. Thus, this new lubricating device makes it possible for lubricant to be introduced not only over the innermost edges of the interengaging elements but over the entire contact surface of the sides of the teeth. Therefore, a lubrication film is formed between the contact surfaces which prevents a direct touching of said contact surfaces. Thus, an efficient and play-free worm drive is formed having little wear and which is suitable for driving of machine tool tables and the like. Since the worm and the internally threaded member are no longer in direct contact with one another, it is not necessary, when measuring said parts and choosing the material, to consider the commonly known friction and heat aspects. Thus, surface treatment, such as hardening, is not necessary.

The lubricating device is constructed most advantageously by connecting the lubricant passageways, which open on opposite sides of the sides of the teeth to distribution passageways which are not interconnected and which are fed separately by two distributors. Thus, a lubrication film is formed on both sides of the worm teeth independently of the load and pressure direction. The lubrication film on one side is not in connection with the lubrication film on the opposite side of the gear tooth so that a pressure balance between both sides is avoided. Thus, it is provided that even if a high difference in pressure exists on the respective sides of the gear teeth, the heavily loaded side is always provided with sufficiently strong film of lubricant.

Further advantages and details of the invention are explained by means of the example of construction shown in the drawing.

FGURE 4 is a cross-sectional view of a modification embodying the invention.

Figure 1:
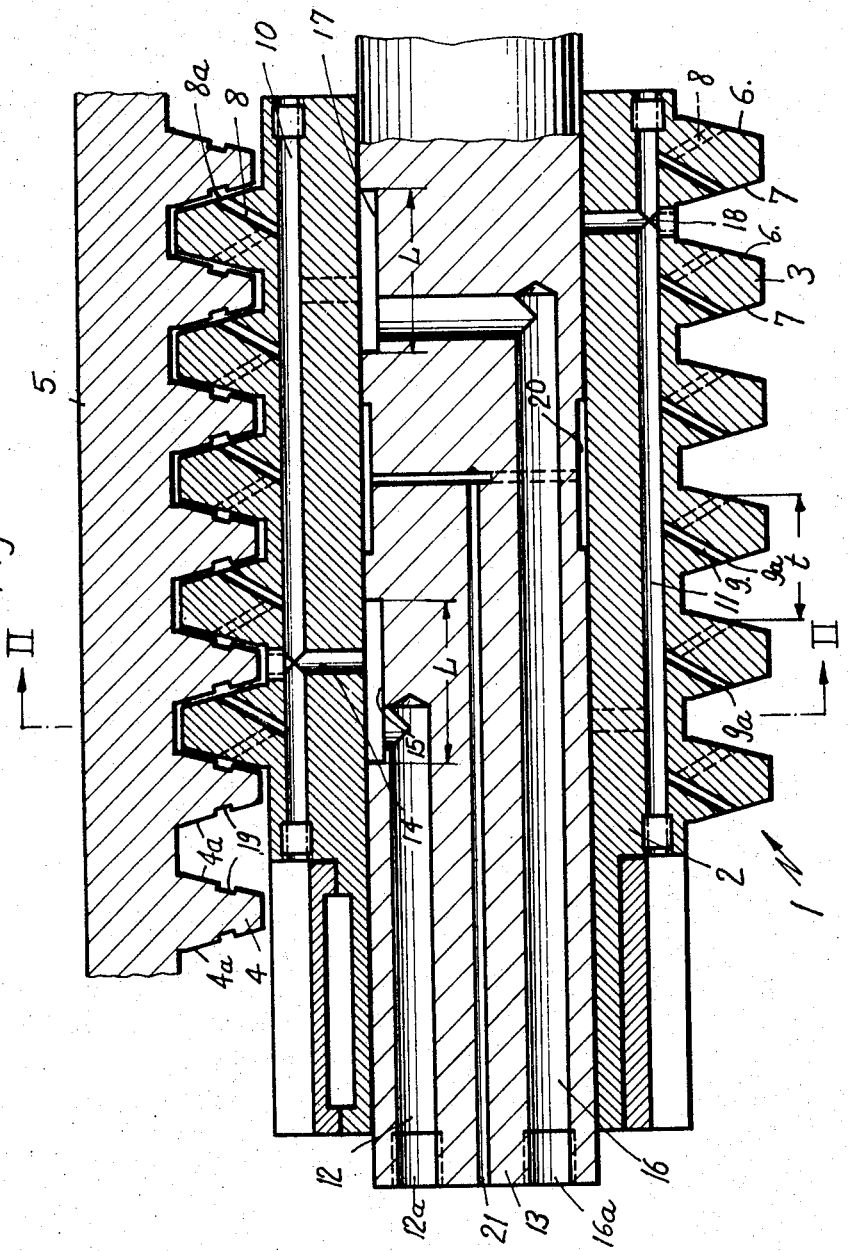
FIGURE 1 is a cross-sectional view of the apparatus embodying the invention.

In FIGURE 1, there is shown a cylindrical worm 1 which comprises the root 2 and the worm teeth 3 arranged thereon. The worm teeth are provided with rectilinear sides, however, same can also be of involute shape or of other forms. The teeth 3 of the worm 1 are in an interengaging arrangement with the teeth 4 of the internally threaded member 5.

The worm 1 is provided at its periphery with a plurality of uniformly spaced lubricant passageways 8 and 9 which open into the sides of teeth 6 and 7, respectively. Said passageways are connected in groups with several distribution passageways 10 and 11 which are provided in the worm root 2. For example, passageways 8 are connected to the distribution passageway 10 and passageways 9 are connected to the distribution passageway 11. Furthermore, the lubricant is fed by means of a control device only to those distribution passageways 10 and 11 which at a given time are in connection with lubricant passageways 8a and 9a positioned between the teeth of the internally threaded member 5.

Figure 2:
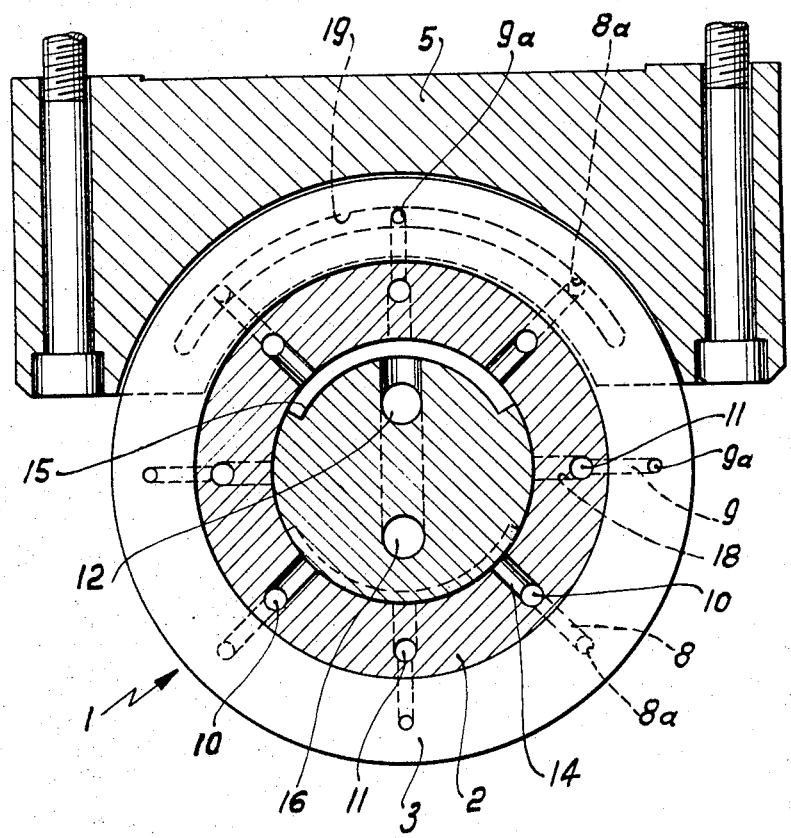
FIGURE 2 is a cross-sectional view taken along the lines II—II in FIGURE 1.

Several control devices can be used to control the lubricant feeding device. For instance, as shown in FIGURES 1 and 2, the control device can be a stationary shaft 13 having at least one longitudinal bore 12 therein and on which the worm 2 is rotatably positioned. The distribution passageways 10 are provided with bores 14 opening toward the shaft 13 and said shaft 13 is further provided with at least one groove 15 extending over one part of its periphery and being connected to the longitudinal bore 12 by the holes 14. Said groove 15, as shown in FIGURE 2, extends over the periphery of the shaft 13 a distance which permits the distribution passageways 10 to feed lubricant only through those holes 14 connected to the lubricant passageways 8 between the teeth of the internally threaded member 5.

Figure 3:
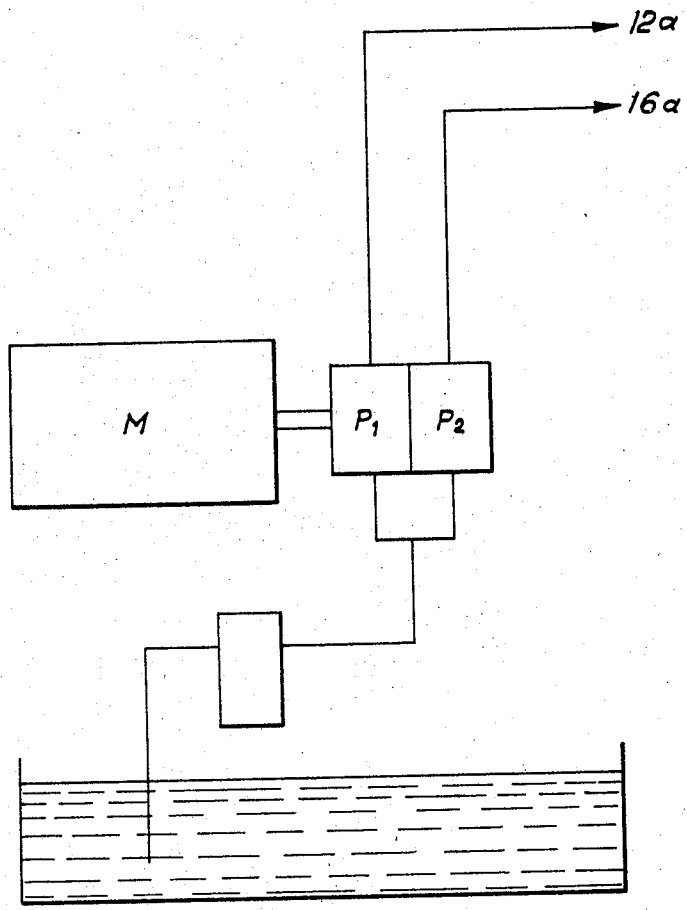
FIGURE 3 is a schematical view of the distributor of the lubricating device.

The lubricant passageways 8 opening to the side 6 of the worm tooth 3 and the lubricant passageways 9 opening to the opposite side 7 of the worm tooth 3 are connected to separate distribution passageways 10 and 11, respectively, and are fed separately by two distributors or pumps P1, P2 (FIGURE 3). In the embodiment shown in FIGURES 1 and 2 the shaft 13 is provided with a second longitudinal bore 16, said bore 16 is connected to the groove 17 in the same way that groove 15 is connected to bore 12. That is, holes 18 provide the connection between the distribution passageways 11 and the lubricant passageways 9. Again the arrangement is set up so that the lubricant under pressure can flow only into the distribution passageways 11 which are facing the internally threaded member 5. Since the groove 17 is positioned axially exactly behind the groove 15, it cannot be seen in FIGURE 2. The axial length L of the grooves 15 and 17 should be at least of the same extent as the pitch $t$ of the worm 1, since in this manner the holes 14 and 18 for the respective distribution passageways 10 and 11, can in all cases be drilled through the root of the worm between the adjacent teeth.

For easy manufacturing of the distribution passageways 10 and 11 and the lubricant passageways 8 and 9 and to combine same together in groups, it is advantageous to arrange the distribution passageways parallel to the axis of the shaft and to connect each one of the lubricant passageway openings 8a and 9a, which are axially aligned with each other, to one distribution passageway 10 or 11. Thus, it is possible as shown in FIGURES 1 and 2, to arrange the lubricant passageways 8 and 9 in the surfaces of the teeth so that the lubricant passageways open at an acute angle into the distribution passageways 10 and 11.

To double the number of points of lubrication and still have the same number of distribution passageways, as shown in FIGURE 4, two rows of passageway openings 9a', which are axially aligned on the sides of successive teeth, are connected by means of a sloping lubricant passageway 9' to a common distribution passageway 11'. Correspondingly, the passageway opening in the other tooth sides are connected by means of the sloping lubricant passageways 8' to the other distribution passageways 10'. Since the passageway openings of the lubricant passageways 8' and of the lubricant passageways 9' are arranged axially in series, the lubricant passageways 8' are shown in FIGURE 4 in broken lines only. Their openings are not marked, since same overlap the openings 9a' of the lubricant passageways 9.

To minimize the number of lubricant passageways 8 and 9 at the periphery of the worm, it is advantageous to provide the sides 4a of the internally threaded member 5 with arcuate lubricant grooves 19 (FIGURE 2) in the area of the openings 8a and 9a and which are closed at or near the ends of the sides of teeth 4a. The lubricant grooves 19 provide an equal distribution of the lubricant across the full width of the sides 4a even if only one shaft opening is positioned within the internally threaded member 5, such as the opening 9a shown in FIGURE 2.

To feed lubricant in equal amounts and under the same pressure to lubricant passageways 8 or 9, the distributors or pumps P1 and P2 (FIGURE 3) are provided which are driven by a common motor M having a synchronization control.

Operation of the new lubricating device is as follows:

The lubricant pumped by the pumps P1 and P2 enters the shaft 13 at the ports 12a and 16a into the longitudinal bores 12 and 16, respectively, and flows to the grooves 15 and 17, respectively. From here, however, it cannot flow into all of the distribution passageways 10 and 11 but only into a part thereof. As shown in FIGURE 2, only those distribution passageways 10 and 11 are fed with lubricant which are in connection with lubricant passageways 8 and 9 positioned between the teeth of the internally threaded member 5. The remaining distribution passageways are blocked from the pressure supply so that the lubricant can only get out within side 4a between the teeth 4, 6 and 7 between the teeth of the internally threaded member 5. A lubricant pad is formed in this area and prevents a direct touching of the sides of teeth 6 and 7 and the sides 4a of the teeth 4. A hydrostatic lubrication is formed which has a high effectiveness and results in little wear. Since the sides of teeth 6 and 7 and the sides 4a of teeth 4 do not touch each other directly, wear resistant considerations such as finishing of the surfaces by hardening, nitriding or the application of a wear improving material, like metal or plastic, are not necessary when choosing the paired materials. Furthermore, a worm gear which is provided with the lubricating device works practically without any backlash. Because of the grooves 15 and 17, a hydrostatic sleeve bearing is formed on the pressure side of the shaft 13 and said bearing reduces the friction between the shaft 13 and the worm. A drain, comprising a ring groove 20 and passageway 21, is provided to direct the oil from the parts needing lubrication back to the reservoir.

This invention is not to be limited to the illustrated embodiment. To control the admission of lubricant, a device could be used at which the lubricant for feeding across a limited angular area of the worm is fed directly into the distribution passageways which now are closed on the front side by a plug. Apart from the arrangement of a stationary shaft, the pressure means could also be fed to the worm by means of bearing shells which are provided with distribution grooves extending circumferentially, said grooves serving the same purpose as the grooves 15 and 17 in the shaft 13, the only difference being that the distribution grooves are provided at the inner side of the bearing shell.

The embodiments of this invention in which an exclusive property or privilege is claimed are defined as follows:

1. A lubricating device for the interengaging elements of a worm and an internally threaded member, comprising:

a shaft rotatably supporting said worm and having first and second passageways therein communicating with first and second axially spaced grooves on the periphery of said shaft, said grooves extending only partway around the periphery of said shaft, said worm having a plurality of third and fourth passageway means therein alternatingly communicating with said first and second grooves, said third passageway means connected to all of the teeth surfaces facing in one axial direction, said fourth passageway means connected to all of the teeth surfaces facing in the opposite axial direction;

valving means connecting said first and second grooves to only selected ones of said third and fourth passageway means which communicate with the teeth surfaces in engagement with the internally threaded member;

first distributor means connected to said first passageway means and second distributor means connected to said second passageway means;

whereby independent pressures are created by said first and second distributor means and are applied to opposite sides of the portions of teeth that engage said worm thereby causing a spacing of said teeth equally between the teeth of said internally threaded member.

2. A lubricating device as defined in claim 1, wherein the axial width of said first and second grooves is at least equal to the pitch of said worm.

3. A lubricating device as defined in claim 1, wherein said third and fourth passageway means comprise a plurality of first and second distributor passageways extending axially through said worm and include a plurality of radial lubricant passageways providing independent fluid communication between said first and second distributor passageways and the oppositely facing surfaces of said teeth on said worm.

4. A lubricating device as defined in claim 3, wherein said plurality of radial lubricant passageways comprises a plurality of pairs of radial lubricant passageways providing independent fluid communication between said first and second distributor passageways and the oppositely facing surfaces of said teeth on said worm.

5. A lubricating device as defined in claim 1, wherein the side surfaces of the teeth of the internally threaded member in the area of the radial lubricant passageways on the teeth of said worm are provided with arcuate grooves.

6. A lubricating device as defined in claim 1, wherein said first and second distributor means are lubricant pumps including means for driving same at the same speed for delivering equal amounts of lubricant to said first and second passageways.

References Cited

UNITED STATES PATENTS

| 1,176,936 | 3/1916 | Waldon | 74—467 X |
| 1,502,083 | 7/1924 | Zoelly | 74—468 |
| 2,320,353 | 6/1943 | Ernst et al. | 74—467 X |
| 3,331,469 | 7/1967 | Deflandre. | |

FOREIGN PATENTS

| 561,250 | 5/1944 | Great Britain. |
| 914,165 | 12/1962 | Great Britain. |

LAVERNE D. GEIGER, *Primary Examiner.*

EDWARD J. EARLS, *Assistant Examiner.*

U.S. Cl. X.R.

74—424.8, 467